United States Patent
Wolf

(10) Patent No.: US 11,977,235 B2
(45) Date of Patent: May 7, 2024

(54) METHOD FOR PROJECTING IMAGE CONTENTS ONTO A USER'S RETINA BY WAY OF AN OPTICAL SYSTEM

(71) Applicant: Robert Bosch GmbH, Stuttgart (DE)

(72) Inventor: Robert Wolf, Dresden (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/187,164

(22) Filed: Mar. 21, 2023

(65) Prior Publication Data

US 2023/0324691 A1    Oct. 12, 2023

(30) Foreign Application Priority Data

Mar. 29, 2022    (DE) .................. 10 2022 203 075.3

(51) Int. Cl.
  *G02B 27/01*    (2006.01)
  *G09G 3/00*    (2006.01)

(52) U.S. Cl.
  CPC ......... *G02B 27/0172* (2013.01); *G09G 3/002* (2013.01); *G02B 2027/014* (2013.01); *G02B 2027/0178* (2013.01); *G09G 2320/02* (2013.01); *G09G 2340/14* (2013.01)

(58) Field of Classification Search
  CPC .......... G02B 27/0172; G02B 2027/014; G02B 2027/0178; G09G 3/002; G09G 2320/02; G09G 2340/14
  See application file for complete search history.

(56) References Cited

U.S. PATENT DOCUMENTS

| | | | |
|---|---|---|---|
| 11,307,405 B2* | 4/2022 | Katsuyama | G09G 3/02 |
| 2011/0122101 A1* | 5/2011 | Kurozuka | G03B 21/006 345/204 |
| 2016/0103324 A1* | 4/2016 | Arakawa | G02B 27/0172 351/158 |
| 2016/0377865 A1* | 12/2016 | Alexander | G02B 26/10 345/8 |
| 2018/0184059 A1* | 6/2018 | Arakawa | G02B 27/0172 |
| 2018/0252920 A1* | 9/2018 | Abe | G09G 5/28 |
| 2019/0004325 A1* | 1/2019 | Connor | G02B 27/0172 |

FOREIGN PATENT DOCUMENTS

| | | |
|---|---|---|
| DE | 102017211914 A1 | 1/2019 |
| EP | 1840627 A2 | 10/2007 |

* cited by examiner

*Primary Examiner* — Kenneth Bukowski
(74) *Attorney, Agent, or Firm* — NORTON ROSE FULBRIGHT US LLP; Gerard A. Messina

(57) ABSTRACT

A method for projecting image contents onto a user's retina using an optical system. A light beam is first projected onto a diverting unit of the optical system using a projector unit of the optical system. The light beam is subsequently diverted to the position of the user's eye. An ascertained deviation of an actual state of the projected light beam diverted by the diverting unit from a desired state is stored using memory unit. Second image data are generated using an image-processing device based on the stored and ascertained deviation of the actual state of the projected light beam from the desired state. The second image data are received using the projector unit. The received second image data are projected at successive second time intervals using the projector unit. At least two of the second time intervals differ from one another in terms of time.

11 Claims, 4 Drawing Sheets

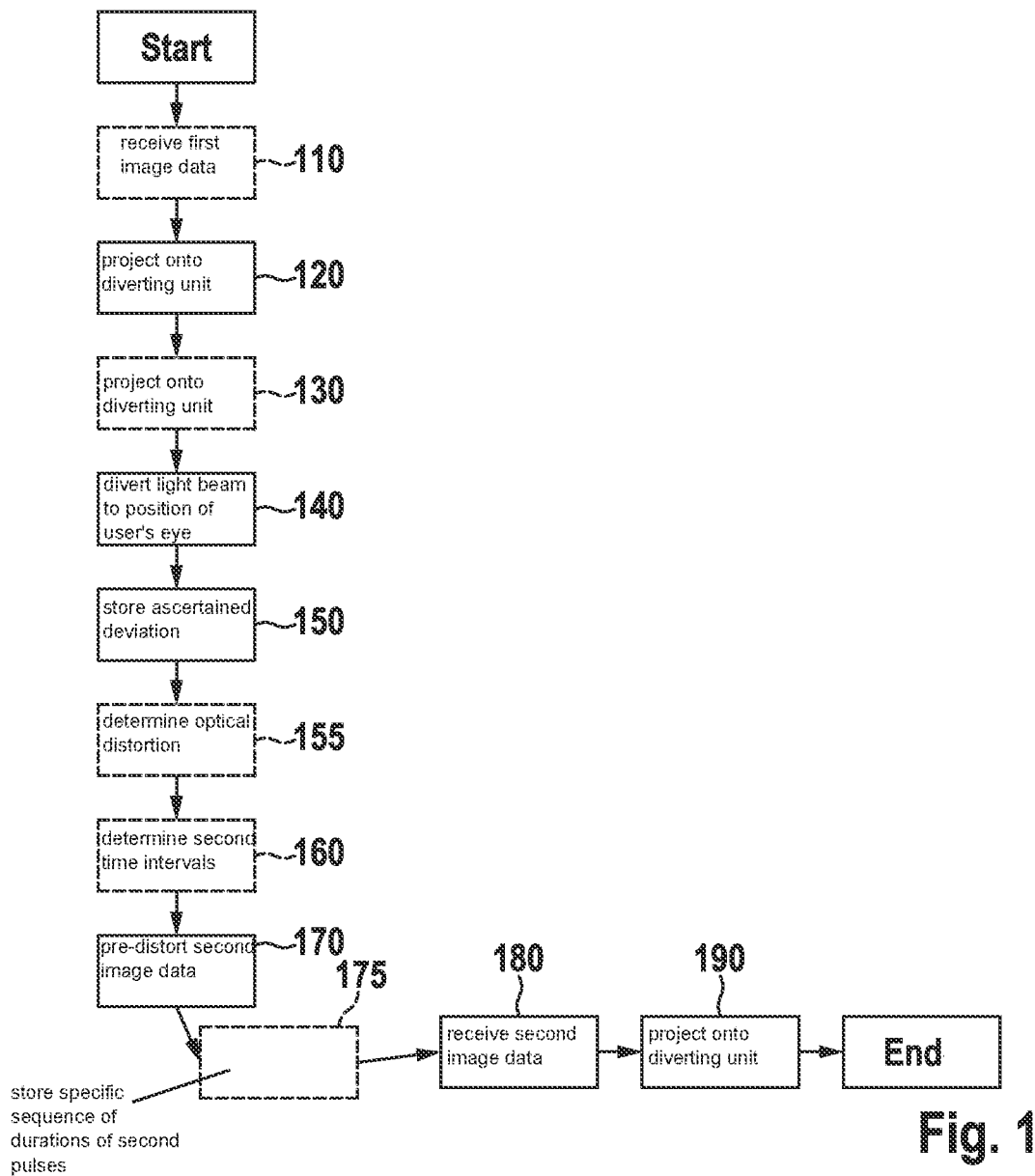
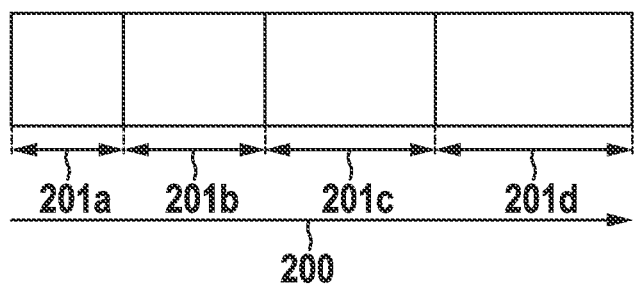

METHOD FOR PROJECTING IMAGE CONTENTS ONTO A USER'S RETINA BY WAY OF AN OPTICAL SYSTEM

CROSS REFERENCE

The present application claims the benefit under 35 U.S.C. § 119 of German Patent Application No. DE 10 2022 203 075.3 filed on Mar. 29, 2022, which is expressly incorporated herein by reference in its entirety.

FIELD

The present invention relates to a method for projecting image contents onto a user's retina by way of an optical system. In addition, the present invention relates to an optical system for projecting image contents onto a user's retina.

BACKGROUND INFORMATION

U.S. Patent Application Publication No. US 2016/0377865 A1 describes a method for projecting image contents onto a user's retina by way of an optical system.

Proceeding therefrom, an object of the present invention is to develop a more energy-efficient method for projecting image contents onto a user's retina.

SUMMARY

The present invention provides a method for projecting image contents onto a user's retina by way of an optical system. In addition, the present invention provides an optical system for projecting image contents onto a user's retina.

According to an example embodiment of the present invention, a method for projecting image contents onto a user's retina is performed by way of an optical system, which comprises an image source which provides image content in the form of image data. In particular, these are unprocessed image data. The image source is in particular configured as an electronic image source, for example as a graphics output, in particular an (integrated) graphics card, of a computer, processor, or the like. Furthermore, the optical system comprises an image-processing device for the image data. The image-processing device is preferably provided to modify, in particular distort, copy, skew, offset, and/or scale, the image data from the image source. Furthermore, the image-processing device is configured to adapt the image data from the image source in respect of operating conditions, in particular a change in a temperature. In particular, the image-processing device is configured to process the image data received from the image source and thus to generate first and/or second and/or third image data. The image-processing device is preferably provided to generate copies of the image content which are in particular modified, for example distorted, skewed, offset, and/or scaled. The image source can, for example, be configured to be integral with the image-processing device of the optical system. Alternatively, the image source can be configured to be separate from the image-processing device and to transmit image data to the image-processing device of the optical system. Furthermore, the optical system comprises a projector unit comprising a time-modulable light source for generating at least one light beam and comprising an actuable deflecting device for the at least one light beam, in particular for the scanning projection of the image content. The projector unit is in particular configured to emit the image content from the image data in the form of scanned and/or rasterized light beams. The projector unit in particular comprises a deflecting device, preferably a MEMS mirror (micromirror actuator), at least for the controlled deflection of the at least one light beam from the light source of the projector unit. Furthermore, the optical system comprises a diverting unit, onto which the image content can be projected and which is configured to direct the projected image content to a position of a user's eye. In this case, an artificial eye or a model of the eye, for example, can be used for determining the position of the user's eye, rather than the user's actual eye. In particular, however, the diverting unit is configured to direct the projected image content to the user's eye. The diverting unit in particular comprises an assembly of optical elements, for example diffractive, reflective, refractive, and/or holographic optical elements. In this case, however, the diverting unit preferably always comprises at least one holographic optical element. The diverting unit is configured to be integrated in a lens of smart glasses at least in part. The diverting unit is in particular provided to divert only part of the intensity of the projected image content to the user's eye. At least one further part of the intensity of the projected image content passes through the diverting unit. The diverting unit appears substantially transparent to a user, at least when viewed from a perpendicular viewing direction. In particular, the diverting unit forms a projection region. In particular, the projection region forms an area within which a light beam is deflected/diverted toward the user's eye, in particular toward a pupil surface of the optical system, when it impinges on the diverting unit.

In the method for projecting image contents onto a user's retina according to an example embodiment of the present invention, at least one light beam is first projected onto the diverting unit of the optical system by way of the projector unit and, from there, is diverted to the position of the user's eye by way of the diverting unit. Furthermore, an ascertained deviation of an actual state of the at least one projected light beam diverted by the diverting unit from a desired state of the at least one light beam is stored by way of a memory unit of the optical system. The light beam can be a light beam which has an intensity that differs over time. A plurality of in particular collimated light beams can also be provided. However, it can, for example, also be just one single light beam, the intensity of which does not change over time. In particular, the deviation of the actual state of the at least one projected light beam diverted by the diverting unit from the desired state of the at least one light beam is ascertained by way of an arithmetic logic unit of the optical system. In particular, an actual position of the diverted light beam on the user's exit pupil plane is compared with a desired position of the diverted light beam on the user's exit pupil plane and the deviation is ascertained in the process. Furthermore, second image data are generated by way of the image-processing device on the basis of the stored deviation of the actual state of the at least one projected light beam from the desired state of the at least one projected light beam. Furthermore, the second image data are received by way of the projector unit. The received second image data, in particular in the form of light beams, are subsequently projected at successive second time intervals by way of the projector unit. In this case, at least two of the second time intervals differ from one another in terms of time. Since the duration of the transmitted image data is thus different at least in some cases, the projection method can be adapted to image data of different sizes. The second time intervals are preferably determined on the basis of the ascertained and stored deviation of the actual state of the at least one projected and diverted light beam from the desired state of the at least one projected light beam.

According to an example embodiment of the present invention, first image data are preferably first received by way of the projector unit. The first image data are in particular unprocessed image data provided by way of the image source. Alternatively, said data can be image data that has been handled, in particular modified, by way of the image-processing device. These first image data are subsequently projected in the form of the at least one light beam by way of the projector unit, in particular by way of first light pulses. The deviation, as actually perceived by the user, of the actual state from the desired state of the projected image content can thus be ascertained more accurately, in particular by way of the arithmetic logic unit. The received first image data are preferably projected by way of the projector unit at equal, successive first time intervals, in particular by way of first light pulses. This in turn makes it possible to ascertain the deviation of the actual state from the desired state as simply as possible. In this context, an in particular optical distortion of the projected image content is preferably present as the deviation of the actual state of the at least one projected light beam diverted by the diverting unit from the desired state of the at least one light beam. This optical distortion results, inter alia, from the temporally variable deflection velocity of the light beam that is deflected, in particular scanned, by way of the deflecting device. Deviations also often occur over the imaging path due to inaccuracies of in particular optical components of the optical system.

According to an example embodiment of the present invention, the first image data are preferably projected onto at least one projection region of the diverting unit over different imaging paths by way of an optical segmentation element of the optical system. In this case, at least some imaging paths are actuated individually, and the in particular optical distortion of the projected image content over the different imaging paths is determined, in particular by way of the arithmetic logic unit of the optical system. The respective deviations can thus be determined for different imaging paths and thus different possible positions of the user's eye, in particular eye-boxes, of the optical system. The optical segmentation element is preferably arranged in a beam path of the scanned light beam between the deflecting device of the projector unit and the diverting unit. The optical segmentation element can in particular be configured as a spatially segmented optical element, which is in particular provided to image/divert spatial segmentation of individual sub-images of the image data in a spatially separate manner. The optical segmentation element can in particular be configured as a time-segmenting optical element. The subsequently generated second image data preferably contain sub-image data, which allow the image content to be projected onto at least one projection region of the diverting unit over different imaging paths. In this case, different sub-image data are generated for at least two different imaging paths. In particular, the sub-image data contain copies or (distorted, offset, skewed, or otherwise scaled) versions of the image content.

Preferably, according to an example embodiment of the present invention, the second image data are distorted, in particular pre-distorted, by way of the image-processing device. The deviation of the actual state from the desired state that was first established, in particular in the user's eye, is thus compensated for or corrected.

According to an example embodiment of the present invention, the second image data are preferably generated on the basis of the stored deviation in the form of a specific sequence of durations of second light pulses. In this case, the duration of each second light pulse corresponds to the duration of an associated second time interval. The image data are accordingly generated as a sequence of time signals, the time gaps therebetween corresponding to the duration of second light pulses. The second image data are projected at the accordingly associated second time intervals. The second image data are preferably additionally generated in the form of in particular different intensities of the second light pulses. This thus makes it possible to project different image data. The specific sequence of durations of second light pulses is preferably stored in the memory unit and is used for generating in particular future third image data. In principle, the initially ascertained deviation of the actual state from the desired state is fixed when using the same optical system, and therefore the deviation can still also be used for further future image data. It is not necessary to ascertain the deviation again and thus store it again, but instead this is predetermined by the specific sequence of durations of second light pulses. Only the intensity of each light pulse changes depending on the respective image data. The stored sequence of durations of second light pulses can in particular be retrieved in one clock cycle, which is quicker, in particular at least four times quicker, than the processing clock cycle of the image data.

The present invention further relates to an optical system for projecting image contents onto a user's retina, said optical system in particular being configured to carry out the above-described method. In this case, according to an example embodiment of the present invention, the optical system comprises an image source, which provides image content in the form of image data. In addition, the optical system comprises an image-processing device for the image data. The optical system also comprises a projector unit comprising a time-modulable light source for generating at least one light beam and comprising an actuable deflecting device for the at least one light beam, in particular for the scanning projection of the image content. In addition, the optical system comprises a diverting unit, onto which the image content can be projected and which is configured to direct the projected image content to a user's eye. The optical system also comprises a memory unit configured to store an ascertained deviation of an actual state of at least one projected light beam diverted by the diverting unit from a desired state of the at least one light beam. The image-processing device is configured to generate, by way of the image-processing device, second image data on the basis of the stored deviation of the actual state of the at least one projected light beam from the desired state of the at least one projected light beam. The projector unit is configured to receive the second image data and to project the received second image data, in particular in the form of light beams, at successive second time intervals. In this case, at least two of the second time intervals differ from one another in terms of time.

According to an example embodiment of the present invention, the optical system preferably additionally comprises an arithmetic logic unit, which is configured to ascertain the deviation of the actual state of the at least one projected light beam diverted by the diverting unit from the desired state of the at least one light beam.

The optical system is preferably configured as smart glasses.

BRIEF DESCRIPTION OF THE DRAWINGS

FIG. 1 shows a method for projecting image contents onto a user's retina by way of an optical system, according to an example embodiment of the present invention.

FIG. 2 shows a sequence of durations of second light pulses, according to an example embodiment of the present invention.

DETAILED DESCRIPTION OF EXAMPLE EMBODIMENTS

Figure 3:
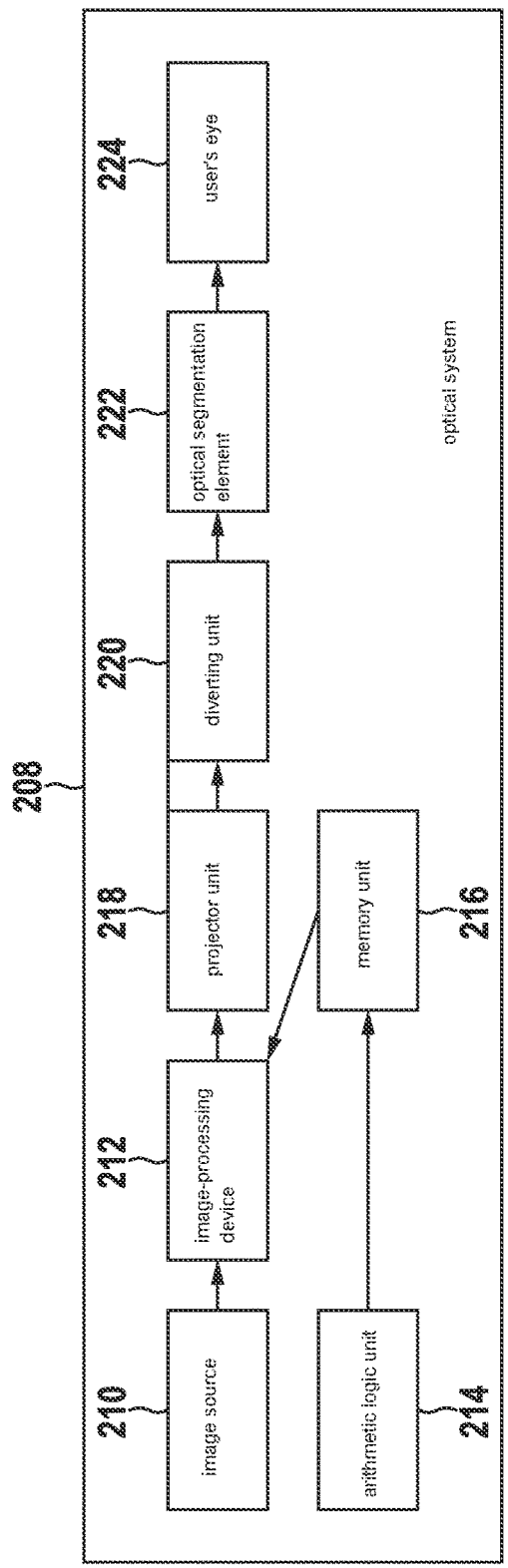
FIG. 3 shows an optical system for projecting image contents onto a user's retina, according to an example embodiment of the present invention.

FIG. 1 shows a method for projecting image contents onto a user's retina by way of an optical system, in the form of a flow chart. In this method, in a method step 120, at least one light beam is projected onto a diverting unit of the optical system by way of a projector unit of the optical system. In a further method step 140, the at least one light beam is diverted to a position of the user's eye by way of the diverting unit. In a subsequent method step 150, an ascertained deviation of an actual state of the at least one projected light beam diverted by the diverting unit from a desired state of the at least one light beam is stored by way of a memory unit of the optical system. In a subsequent method step 170, second image data are generated by way of the image-processing device on the basis of the stored deviation of the actual state of the at least one projected light beam from the desired state of the at least one projected light beam. In a subsequent method step 180, the second image data are received by way of the projector unit. In a method step 190, the received second image data, in particular in the form of further light beams, are subsequently projected onto the diverting unit of the optical system at successive second time intervals by way of the projector unit. In this case, at least two of the second time intervals differ from one another in terms of time. After this, the method is terminated.

Optionally, the deviation of the actual state of the at least one projected light beam diverted by the diverting unit from the desired state of the at least one light beam is ascertained by way of an arithmetic logic unit of the optical system.

In an optional method step 110, first image data are first received by way of the projector unit. In a further method step 130 following the method step 120, the first image data are then projected onto the diverting unit of the optical system in the form of the at least one light beam by way of the projector unit, in particular by way of first light pulses. In this case, the first image data are optionally projected by way of the projector unit at equal, successive first time intervals.

Optionally, in method step 150, an in particular optical distortion of the projected image content is present as the deviation of the actual state of the at least one projected light beam diverted by the diverting unit from the desired state of the at least one light beam. Optionally, in method step 130, the first image data are projected onto at least one projection region of the diverting unit over different imaging paths by way of an optical segmentation element of the optical system. In this case, at least some imaging paths can be actuated individually. In this context, in a method step 155 following the method step 150, the in particular optical distortion of the projected image content over the different imaging paths is determined, in particular by way of the arithmetic logic unit of the optical system. In this context, the generated second image data optionally contain sub-image data, which allow the image content to be projected onto at least one projection region of the diverting unit over different imaging paths. In this case, different sub-image data are generated for at least two different imaging paths.

In an optional method step 160 following the method step 150, the second time intervals are determined on the basis of the ascertained and stored deviation of the actual state of the at least one projected and diverted light beam from the desired state of the at least one projected light beam.

Optionally, in method step 170, the second image data are distorted, in particular pre-distorted, by way of the image-processing device.

Furthermore, in method step 170, the second image data are optionally generated on the basis of the ascertained and stored deviation in the form of a specific sequence of durations of second light pulses. In this case, the duration of each second light pulse corresponds to the duration of an associated second time interval. In this context, FIG. 2 schematically shows second image data in the form of a specific time sequence 200 of different durations 201*a*, 201*b*, 201*c* and 201*d* of second light pulses. In addition, in particular different intensities of the second light pulses are optionally added within the duration of each light pulse. In a further optional method step 175 following method step 170, the specific sequence of durations of second light pulses is stored in the memory unit. This stored sequence of second durations is used for generating in particular future third image data.

FIG. 3 schematically shows an optical system 208 for projecting image contents onto a user's retina. In this case, the optical system 208 comprises an image source 210, which provides image content in the form of image data. In addition, the optical system 208 comprises an image-processing device 212 for the image data. In addition, the optical system 208 comprises a projector unit 218 comprising a time-modulable light source (not shown here) for generating at least one light beam and comprising an actuable deflecting device (not shown here) for the at least one light beam, in particular for the scanning projection of the image content. In addition, the optical system 208 comprises a diverting unit 220, onto which the image content can be projected and which is configured to direct the projected image content to a user's eye 224. The optical system 208 additionally comprises a memory unit 216 configured to store an ascertained deviation of an actual state of at least one projected light beam diverted by the diverting unit 220 from a desired state of the at least one light beam.

The image-processing device 212 is configured to generate second image data on the basis of the stored deviation of the actual state of the at least one projected light beam from the desired state of the at least one projected light beam. The projector unit 218 is configured to receive the second image data and to project the received second image data, in particular in the form of light beams, at successive second time intervals. In this case, at least two of the second time intervals differ from one another in terms of time.

Optionally, an arithmetic logic unit 214, in particular of the optical system 208, is configured to ascertain the deviation of the actual state of the at least one projected light beam diverted by the diverting unit 220 from the desired state of the at least one light beam.

Optionally, the memory unit 216 is configured to store the generated second image data, which are in particular generated on the basis of the ascertained and stored deviation by way of the arithmetic logic unit 214, in the form of a specific sequence of durations of second light pulses. In this case, the stored sequence of second durations is used for generating in particular future third image data.

Furthermore, the optical system 208 optionally comprises an optical segmentation element 222, which is configured to project first and/or second image data onto at least one projection region of the diverting unit over different imaging paths. In this case, at least some imaging paths can be actuated individually. In this context, the arithmetic logic unit 214 is configured to determine the in particular optical distortion of the projected image content over the different imaging paths.

Figure 4:
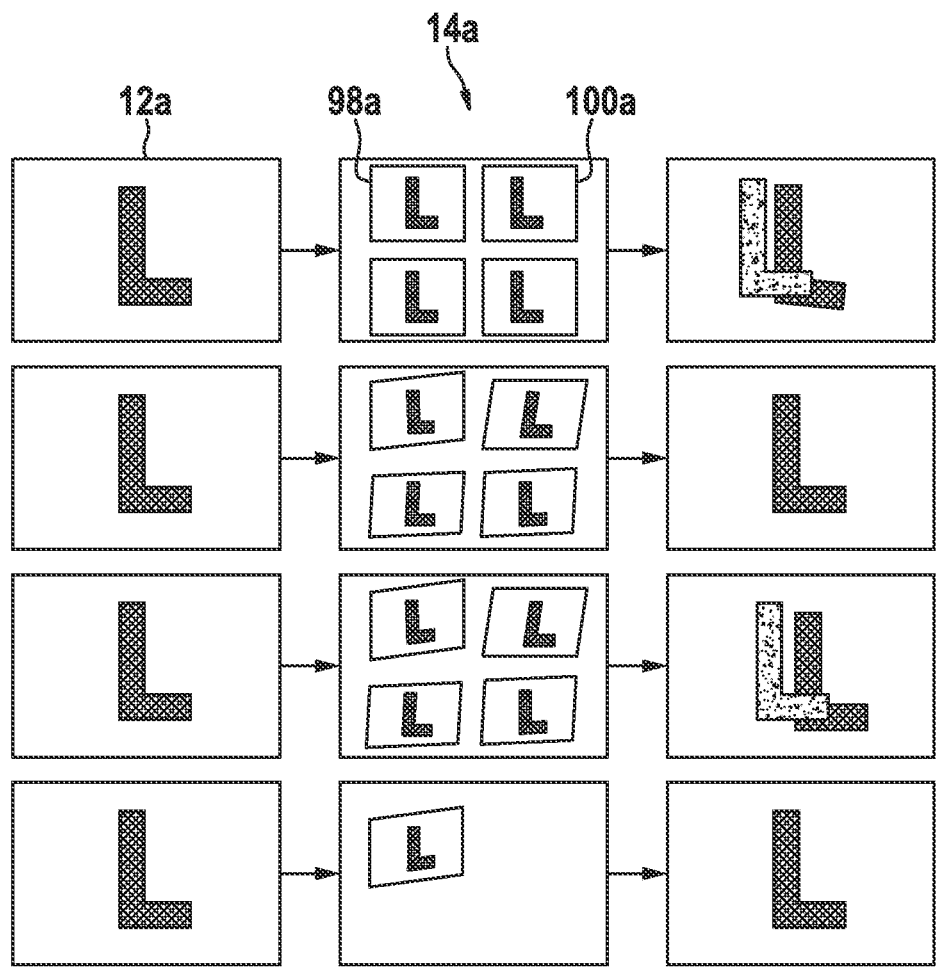
FIG. 4 is a schematic illustration of the relationship between image data, sub-image data, and an image imaged on a retina, according to an example embodiment of the present invention.

FIG. 4 is a schematic illustration of the relationship between in particular unprocessed image data 12*a* (left-hand column), (parameterized/modified) sub-image data (middle column) in the form of generated second image data 14*a*, and an image imaged on the retina (right-hand column). The left-hand column shows the image data 12*a* received by the image-processing device. The middle column shows the sub-image data, which have been split into a matrix and parameterized/modified by the image-processing device 10, in the form of second image data 14*a*. The middle column shows the sub-image data output by the projector unit in order to allow the image content to be projected onto at least one projection region of the diverting unit over different imaging paths. The sub-image data in the form of second image data 14*a* include the (partly parameterized/modified/scaled) sub-images 98*a*, 100*a*. The right-hand column shows possible image formations on the retina of the user's eye. Where the sub-images 98*a*, 100*a* (first row) are identical (unparameterized/unmodified/unscaled), the image contents coming from exit pupils entering the user's eye may be insufficiently superimposed. By shifting, skewing, rescaling, and/or distorting the sub-images 98*a*, 100*a*, in particular in the projector image, the same visual impression is always generated on the retina, even if a plurality of separate exit pupils are located directly in the region of the pupil of the user's eye.

Figure 5:
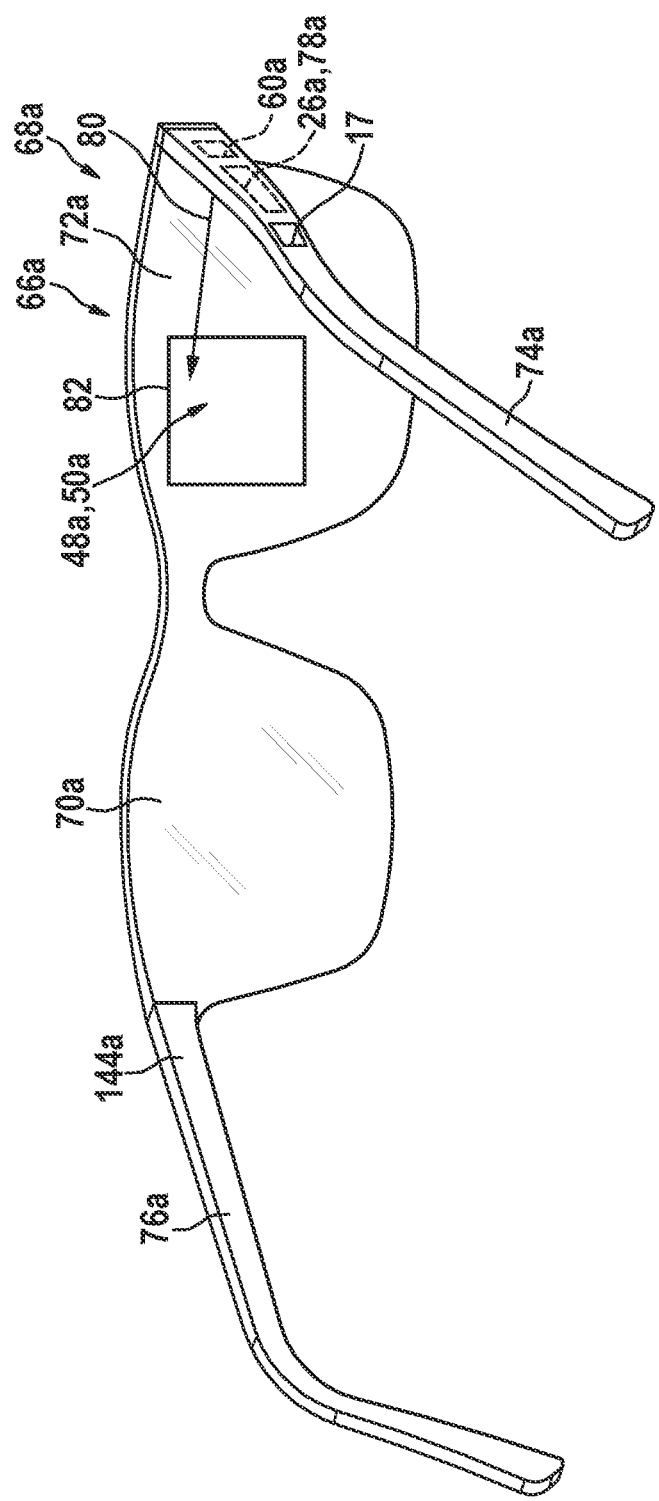
FIG. 5 shows an optical system for projecting image contents onto a user's retina in the form of smart glasses, according to an example embodiment of the present invention.

FIG. 5 schematically shows smart glasses in the form of an optical system 68*a*. In this case, the optical system is in particular configured to carry out the method described in FIG. 1 for projecting image contents onto a user's retina. The smart glasses comprise lenses 70*a* and 72*a*. The lenses 70*a* and 72*a* are predominantly transparent. The smart glasses comprise frames 144*a* comprising temples 74*a*, 76*a*. The optical system 68*a* comprises an image source 26*a*, which provides image content in the form of image data and comprises an image-processing device 78*a* for the image data. Furthermore, the optical system 68*a* comprises a projector unit 60*a* comprising a time-modulable light source for generating at least one light beam 80 and comprising an actuable deflecting device (not shown here) for the at least one light beam for the scanning projection of the image content. In addition, the optical system 68*a* comprises a diverting unit 48*a* comprising a holographically optical element 50*a*. In this case, the diverting unit 48*a* is configured to direct the image content projected onto the diverting unit 48*a* to a position of a user's eye.

What is claimed is:

1. A method for projecting image contents onto a user's retina using an optical system, the optical system including: an image source, which provides image content in the form of image data, an image-processing device for the image data, a projector unit including a time-modulable light source configured to generate at least one light beam and including an actuable deflecting device for the at least one light beam for a scanning projection of the image content, a diverting unit onto which the image content can be projected and which is configured to direct the projected image content to a position of a user's eye, wherein the method comprises the following steps:
projecting at least one light beam using the projector unit onto the diverting unit of the optical system;
diverting the light beam to the position of the user's eye;
storing an ascertained deviation of an actual state of the at least one projected light beam diverted by the diverting unit from a desired state of the at least one light beam, using a memory unit of the optical system;
generating second image data based on the stored deviation of the actual state of the at least one projected light beam from the desired state of the at least one projected light beam by way of the image-processing device;
receiving the second image data using the projector unit; and
projecting the received second image data in the form of light beams using the projector unit, at successive second time intervals, wherein at least two of the second time intervals differ from one another in terms of time, wherein the second image data are generated based on the ascertained and stored deviation in the form of a specific sequence of durations of second light pulses, the duration of each of the second light pulses corresponding to the duration of an associated second time interval of the second time intervals, and wherein the specific sequence of the durations of second light pulses is stored in a memory unit, and the specific sequence of the second durations is used for generating in future third image data.

2. The method as recited in claim 1, wherein the second time intervals are determined based on the stored deviation of the actual state of the at least one projected and diverted light beam from the desired state of the at least one projected light beam.

3. The method as recited in claim 1, further comprising the following steps:
receiving first image content in the form of first image data by way of the projector unit; and
projecting the first image data in the form of the at least one light beam using the projector unit using first light pulses.

4. The method as recited in claim 3, wherein the received first image data are projected using the projector unit at equal, successive first time intervals, using first light pulses.

5. The method as recited in claim 3, wherein an optical distortion of the projected first image data is present as the deviation of the actual state of the at least one projected light beam diverted by the diverting unit from the desired state of the at least one light beam.

6. The method as recited in claim 1, wherein the second image data are pre-distorted using the image-processing device.

7. The method as recited in claim 1, wherein the second image data are generated in the form of different intensities of the second light pulses.

8. A method for projecting image contents onto a user's retina using an optical system, the optical system including: an image source, which provides image content in the form of image data, an image-processing device for the image data, a projector unit including a time-modulable light source configured to generate at least one light beam and including an actuable deflecting device for the at least one light beam for a scanning projection of the image content, a diverting unit onto which the image content can be projected and which is configured to direct the projected image content to a position of a user's eye, wherein the method comprises the following steps:

projecting at least one light beam using the projector unit onto the diverting unit of the optical system;

diverting the light beam to the position of the user's eye;

storing an ascertained deviation of an actual state of the at least one projected light beam diverted by the diverting unit from a desired state of the at least one light beam, using a memory unit of the optical system;

generating second image data based on the stored deviation of the actual state of the at least one projected light beam from the desired state of the at least one projected light beam by way of the image-processing device;

receiving the second image data using the projector unit;

projecting the received second image data in the form of light beams using the projector unit, at successive second time intervals, wherein at least two of the second time intervals differ from one another in terms of time;

receiving first image content in the form of first image data by way of the projector unit; and projecting the first image data in the form of the at least one light beam using the projector unit using first light pulses, wherein an optical distortion of the projected first image data is present as the deviation of the actual state of the at least one projected light beam diverted by the diverting unit from the desired state of the at least one light beam, wherein the first image data are projected onto at least one projection region of the diverting unit over different imaging paths using an optical segmentation element of the optical system, at least some of the imaging paths being actuated individually, and the optical distortion of the projected first image data over the different imaging paths being determined using an arithmetic logic unit of the optical system.

9. The method as recited in claim 8, wherein the generated second image data contain sub-image data, the sub-image data allowing the image content to be projected onto at least one projection region of the diverting unit over different imaging paths, and different sub-image data are generated for at least two different imaging paths.

10. An optical system for projecting image contents onto a user's retina, comprising an image source which provides image content in the form of image data;

an image-processing device for the image data; and a projector unit including a time-modulable light source configured to generate at least one light beam and including an actuable deflecting device for the at least one light beam configured for a scanning projection of the image content;

a diverting unit onto which the image content can be projected and which is configured to direct the projected image content to a user's eye; and a memory unit configured to store an ascertained deviation of an actual state of at least one projected light beam diverted by the diverting unit from a desired state of the at least one light beam;

wherein the image-processing device is configured to generate second image data based on the ascertained and stored deviation of the actual state of the at least one projected light beam from the desired state of the at least one projected light beam;

wherein the projector unit is configured to receive the second image data and to project the received second image data in the form of light beams, at successive second time intervals, wherein at least two of the second time intervals differ from one another in terms of time;

wherein the second image data are generated based on the ascertained and stored deviation in the form of a specific sequence of durations of second light pulses, the duration of each of the second light pulses corresponding to the duration of an associated second time interval of the second time intervals; and wherein the specific sequence of the durations of second light pulses is stored in a memory unit, and the specific sequence of the second durations is used for generating in future third image data.

11. The optical system as recited in claim 10, wherein the optical system is configured as smart glasses.

* * * * *